United States Patent
Yoda et al.

(10) Patent No.: US 6,592,360 B2
(45) Date of Patent: *Jul. 15, 2003

(54) MOLD CLAMPING APPARATUS OF INJECTION MOLDING MACHINE

(75) Inventors: Tsukasa Yoda, Nagano (JP); Hiroo Okubo, Nagano (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 148 days.

This patent is subject to a terminal disclaimer.

(21) Appl. No.: 09/730,756

(22) Filed: Dec. 7, 2000

(65) Prior Publication Data

US 2001/0051194 A1 Dec. 13, 2001

(30) Foreign Application Priority Data

Dec. 8, 1999 (JP) ............................................ 11-348477

(51) Int. Cl.⁷ .............................................. B29C 45/64
(52) U.S. Cl. ..................... 425/589; 425/451.7; 425/593; 425/595
(58) Field of Search ............................. 425/590, 593, 425/595, 451.2, 451.7, 451.9

(56) References Cited

U.S. PATENT DOCUMENTS

| | | | | |
|---|---|---|---|---|
| 3,156,014 A | * | 11/1964 | Wenger | |
| 3,191,235 A | * | 6/1965 | Rougement | ............... 425/451.7 |
| 3,590,437 A | * | 7/1971 | Annis, Jr. et al. | |
| 3,687,590 A | * | 8/1972 | Cyriax | ................... 425/451.7 |
| 3,765,812 A | * | 10/1973 | Sugiyama | |
| 3,905,741 A | * | 9/1975 | Poncet | ..................... 425/451.7 |
| 5,368,463 A | * | 11/1994 | Kassner et al. | ............. 425/590 |

FOREIGN PATENT DOCUMENTS

JP        8-1847        1/1996

* cited by examiner

Primary Examiner—James P. Mackey
(74) Attorney, Agent, or Firm—Birch, Stewart, Kolasch & Birch, LLP

(57) ABSTRACT

A mold clamping apparatus of an injection molding machine is equipped with a drive mechanism for opening, closing, and clamping a mold. The drive mechanism includes a first drive mechanism portion including a first drive motor portion and a first ball-screw mechanism portion and advancing and retracting a movable platen in order to effect high-speed mold opening/closing operation; a second drive mechanism portion including a second drive motor portion and a second ball-screw mechanism portion and pressing a pressure platen in order to effect high-pressure mold clamping operation; and a clutch mechanism for connecting the pressure platen to the movable platen in a pressure applicable manner when the movable platen is located at a mold close position. The first drive mechanism portion advances and retracts the movable platen in order to effect high-speed mold opening/ closing operation. When the movable platen has reached the mold close position (when the mold has been closed), the clutch mechanism connects the pressure platen to the movable platen. Subsequently, the second drive mechanism portion advances the pressure platen in order to apply pressure to the movable platen via the clutch mechanism, thereby effecting high-pressure mold clamping.

5 Claims, 5 Drawing Sheets

MOLD CLAMPING APPARATUS OF INJECTION MOLDING MACHINE

BACKGROUND OF THE INVENTION

1. Field of the Invention

The present invention relates to a mold clamping apparatus of an injection molding machine, equipped with a drive mechanism for opening/closing and clamping a mold by use of a drive motor and a ball-screw mechanism.

2. Description of the Related Art

A conventional mold clamping apparatus of an injection molding machine, equipped with a drive mechanism for opening/closing and clamping a mold by use of a drive motor and a ball-screw mechanism, is disclosed in, for example, Japanese Utility Model Publication (kokoku) No. 8(1996)-1847.

The disclosed mold clamping apparatus includes a first ball nut disposed rotatably on a movable platen; a mold-clamping motor for rotating the first ball nut; a second ball screw rotatably screw-engaged with the movable platen provided on a base; a mold-opening/closing motor for rotating the second ball screw; a first ball screw screw-engaged with the first ball nut and having a spline portion; a mold-clamping housing disposed on the base and having a hole portion formed therein in order to receive the spline portion; a support plate disposed in the vicinity of the hole portion and adapted to hold the spline portion; and a clutch plate disposed movably and adapted to stop up the hole portion.

However, the above-mentioned conventional mold clamping apparatus involves the following problems.

First, since a drive system for opening/closing the mold at high speed and a drive system for clamping the mold at high pressure are independent of each other and do not assume symmetry (are not balanced), the drive systems involve difficulty in operating smoothly and place limitations on an increase in speed of opening/closing the mold and an increase in mold clamp pressure.

Second, mechanism components are independent of each other and are dispersed; in other words, configuration or layout is not designed rationally, resulting in an increase in the overall size of the mold clamping apparatus.

SUMMARY OF THE INVENTION

An object of the present invention is to provide a mold clamping apparatus of an injection molding machine which can make its drive systems symmetric (balanced) to thereby enable smooth operation and increase operation speed and clamp pressure sufficiently.

Another object of the present invention is to provide a mold clamping apparatus of an injection molding machine, capable of attaining a compact overall size thereof through rational design of configuration and layout.

To achieve the above objects, the present invention provides a mold clamping apparatus of an injection molding machine having a drive mechanism which performs mold opening/closing operation and mold clamping operation by use of a drive motor and a ball-screw mechanism. The drive mechanism comprises: a first drive mechanism portion including a first drive motor portion and a first ball-screw mechanism portion and advancing and retracting a movable platen in order to effect high-speed mold opening/closing operation; a second drive mechanism portion including a second drive motor portion and a second ball-screw mecha- nism portion and pressing a pressure platen in order to effect high-pressure mold clamping operation; and a clutch mechanism for connecting the pressure platen to the movable platen in a pressure applicable manner when the movable platen is located at a mold close position.

In the mold clamping apparatus, the first drive mechanism portion advances and retracts the movable platen in order to effect high-speed mold opening/closing operation. When the movable platen has reached the mold close position (when the mold has been closed), the clutch mechanism connects the pressure platen to the movable platen. That is, when the movable platen has reached the mold close position, a predetermined gap is provided between a pressure receiving portion of the movable platen and the pressure platen, to thereby enable insertion of paired clutch plates into the gap. After the insertion of paired clutch plates, the second drive mechanism portion advances the pressure platen via a toggle link mechanism in order to apply pressure to the pressure receiving portion via the clutch plates. With this operation, pressure is applied to the movable platen in order to effect high-pressure mold clamping.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known parts is omitted.

First, the configuration of a mold clamping apparatus 1 according to the present embodiment will be described with reference to FIGS. 1 to 3.

Figure 1:
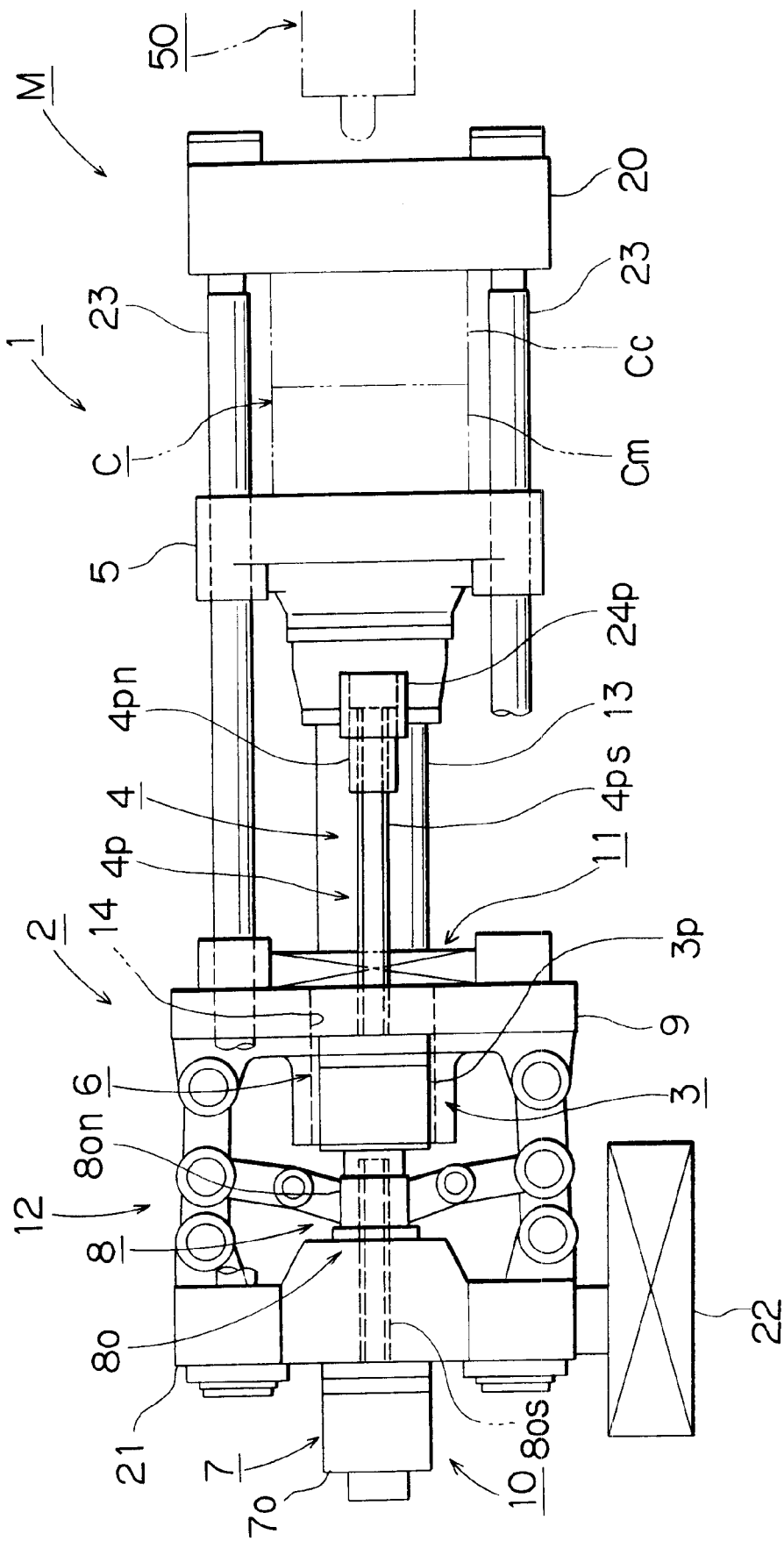
FIG. 1 is a side view of a mold clamping apparatus according to an embodiment of the present invention.
Figure 2:
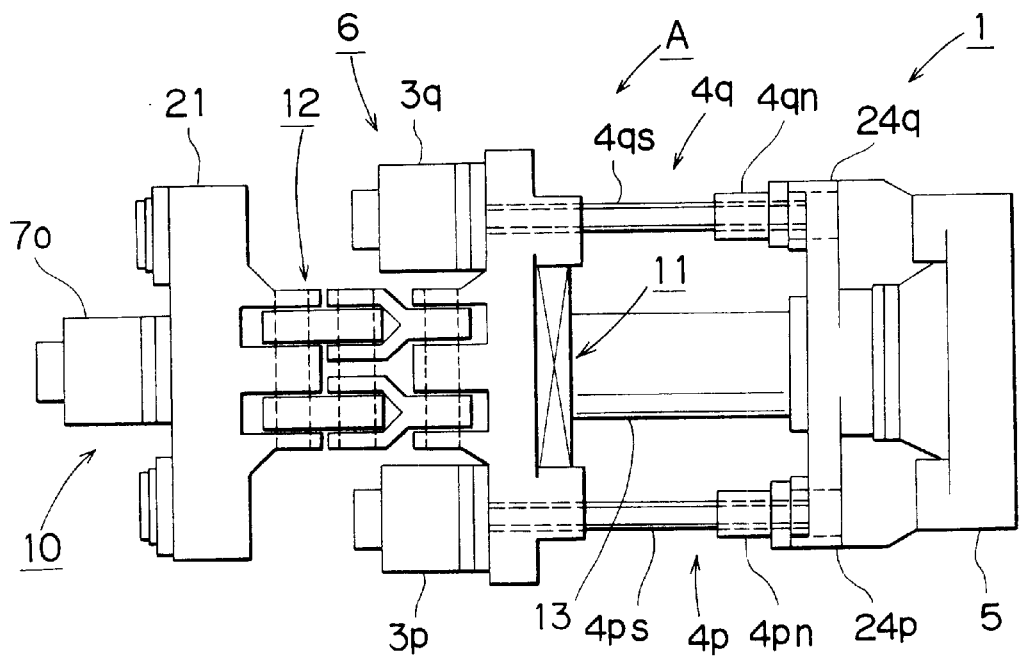
FIG. 2 is a plan view of the mold clamping apparatus of FIG. 1.
Figure 3:
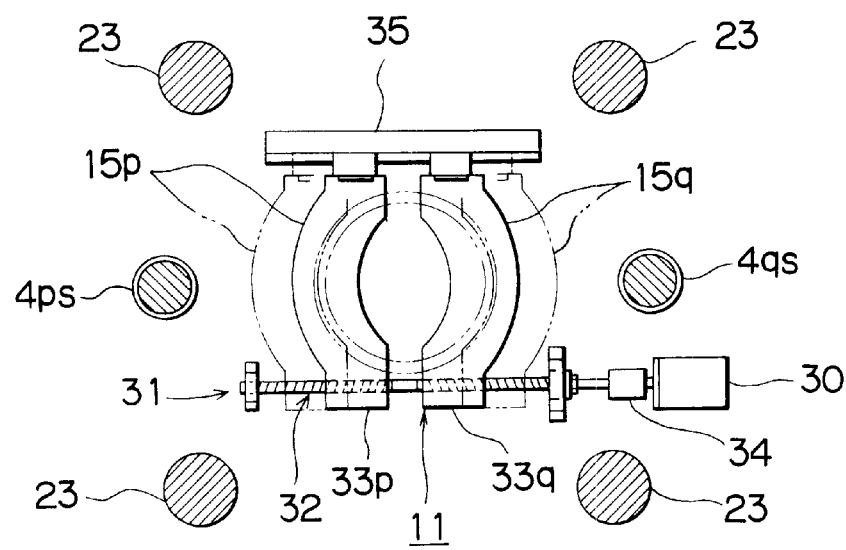
FIG. 3 is a partially sectional front view of the mold clamping apparatus of FIG. 1, showing the positional relationship between the tie bars and ball screws of the mold clamping apparatus, as well as the structure of a clutch mechanism of the mold clamping apparatus.

In FIGS. 1 to 3, symbol M denotes an injection molding machine, which includes the mold clamping apparatus 1 according to the present embodiment and an injection apparatus 50 shown by an imaginary line. The mold clamping apparatus 1 includes a stationary platen 20 and a drive base 21 which are disposed to be separated from each other. The stationary platen 20 is fixedly mounted on an unillustrated machine base. The drive base 21 is supported by a drive-base-position setting mechanism 22 such that the position of the drive base 21 can be adjusted. Further, four tie bars 23 (see FIG. 3) extend between the stationary platen 20 and the drive base 21. A movable platen 5 is mounted slidably on the tie bars 23, and a pressure platen 9 is mounted on the tie bars 23 such that the pressure platen 9 is slidable between the movable platen 5 and the drive base 21. Notably, the tie bars 23 penetrate the drive base 21. A movable mold Cm is attached to the movable platen 5, while a stationary mold Cc is attached to the stationary platen 20. The movable mold Cm and the stationary mold Cc constitute a mold C.

A drive mechanism portion 2 is disposed by use of the drive base 21. Specifically, a first drive mechanism portion 6 is disposed between the movable platen 5 and the pressure platen 9. The first drive mechanism portion 6 includes two (left and right) servomotors (drive motors) 3p and 3q attached to the pressure platen 9 at symmetrical positions, and two (left and right) ball-screw mechanisms 4p and 4q driven by the respective servomotors (drive motors) 3p and 3q. In the present embodiment, symmetric left and right nut attachment portions 24p and 24q are provided on the rear portion of the movable platen 5, and nuts 4pn and 4qn of the ball-screw mechanisms 4p and 4q are attached to the nut attachment portions 24p and 24q. Further, the rear ends of ball screws 4ps and 4qs in screw engagement with the nuts 4pn and 4qn penetrate through-holes formed in the pressure platen 9 and are coupled (direct coupling) to the rotor shafts of the servomotors 3p and 3q. Regular and reverse threads are formed on the ball screws 4ps and 4qs, respectively. The servomotors 3p and 3q constitute a first drive motor portion 3, whereas the ball-screw mechanisms 4p and 4q constitute a first ball-screw mechanism portion 4. Since the first drive mechanism portion 6 carries out high-speed mold opening/closing operation by advancing and retracting the movable platen 5, the servomotors 3p and 3q and the ball-screw mechanisms 4p and 4q can be of relatively small types. FIG. 3 is a partially sectional front view of the mold clamping apparatus of FIG. 1, showing the positional relationship between the four tie bars 23 and the two (left and right) ball screws 4ps and 4qs.

Further, a second drive mechanism portion 10 is disposed by use of the pressure platen 9 and the drive base 21. The second drive mechanism portion 10 includes a single servomotor (drive motor) 7o attached to the center of the drive base 21, and a single ball-screw mechanism 8o driven by the servomotor 7o. In the present embodiment, the rear end of a ball screw 8os of the ball-screw mechanism 8o is coupled (direct coupling) to the rotor shaft of the servomotor 7o, and the front end of the ball screw 8os penetrates a through-hole formed in the drive base 21 such that the front end projects forward from the drive base 21. A nut 8on in screw engagement with the ball screw 8os is connected to the drive base 21 and the pressure platen 9 via a toggle link mechanism 12. The servomotor 7o constitutes a second drive motor portion 7, whereas the ball-screw mechanism 8o constitutes a second ball-screw mechanism portion 8. Since the second drive mechanism portion 10 has a function of performing high-pressure clamping by pressing the pressure platen 9 via the toggle link mechanism 12, the servomotor 7o is of a low-speed, high drive-torque type, and the ball screw 8os of the ball-screw mechanism 8o has a relatively small pitch (small lead).

Moreover, a clutch mechanism 11 is disposed on a surface of the pressure platen 9, which surface faces the movable platen 5. In the present embodiment, in order to operate the clutch mechanism 11, a pressure receiving portion 13 is provided at the center of the rear end of the movable platen 5 such that the pressure receiving portion 13 projects rearward, and a through-hole 14 is formed in the pressure platen 9 in order to enable passage of the pressure receiving portion 13 therethrough. Meanwhile, as shown in FIG. 3, the clutch mechanism 11 includes a drive motor 30; a ball-screw mechanism 31 having a ball screw 32, which is rotated by the drive motor 30; two (left and right) clutch plates 15p and 15q, into which two (left and right) nuts 33p and 33q of the ball-screw mechanism 31 are incorporated at their ends; and an elastic coupling 34 adapted to connect the drive motor 30 and the ball screw 32. The left half and right half of the ball screw 32 are threaded in a mutually reverse manner. When the drive motor 30 is operated, the clutch plates 15p and 15q can be moved symmetrically to the left and right, respectively. The other ends of the clutch plates 15p and 15q are supported slidably by the guide rail 35. The elastic coupling 34 prevents occurrence of galling or other problems which would otherwise occur upon movement of the clutch plates 15p and 15q. Therefore, through operation of the drive motor 30, the clutch plates 15p and 15q can be moved to approach toward or separate from each other. The clutch mechanism 11 is a mere example, and the clutch plates 15p and 15q may be moved independent of each other by use of left and right clutch mechanisms disposed symmetrically.

Figure 4:
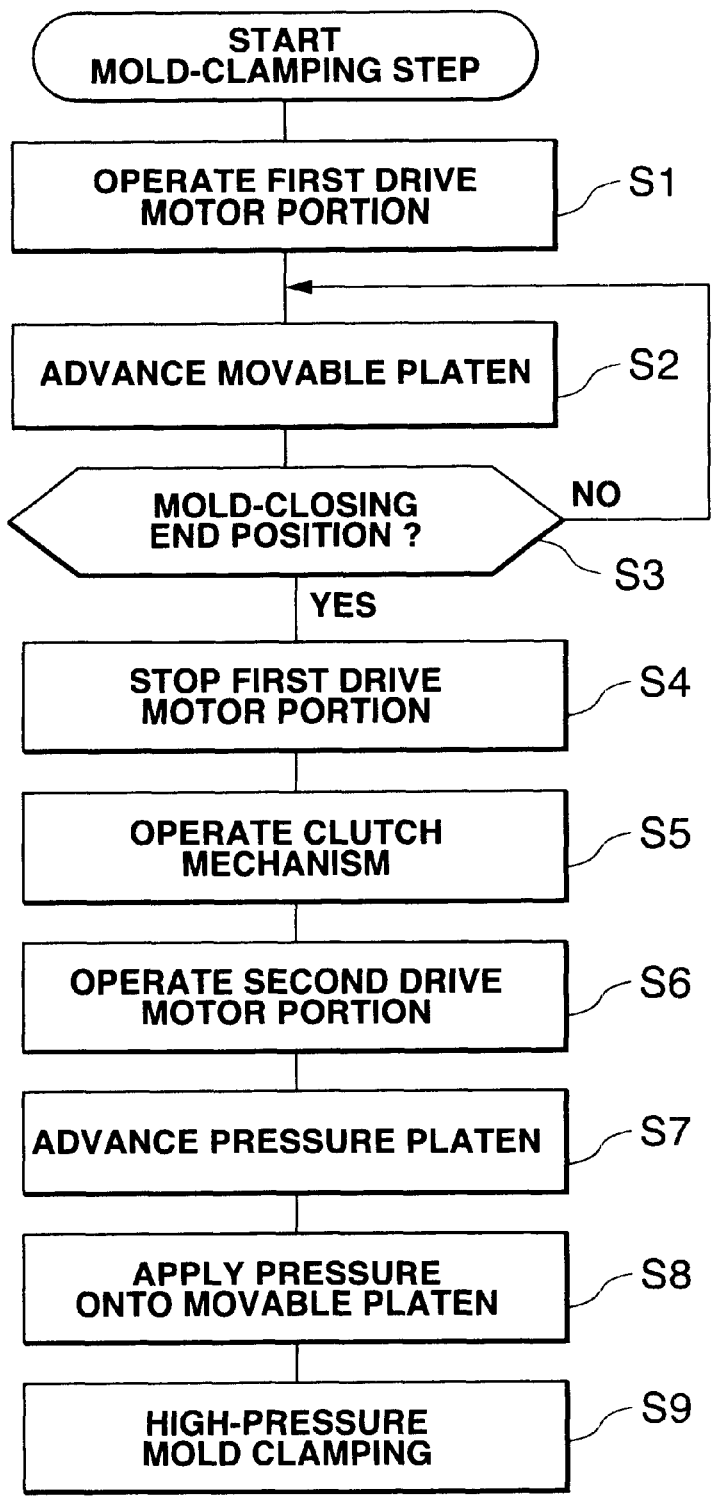
FIG. 4 is a flowchart showing the operation of the mold clamping apparatus of FIG. 1 in a mold clamping step.

Next, the operation, particularly a mold clamping operation, of the mold clamping apparatus 1 according to the present embodiment will be described with reference to FIGS. 5 to 8 and in accordance with a flowchart shown in FIG. 4.

Figure 5:
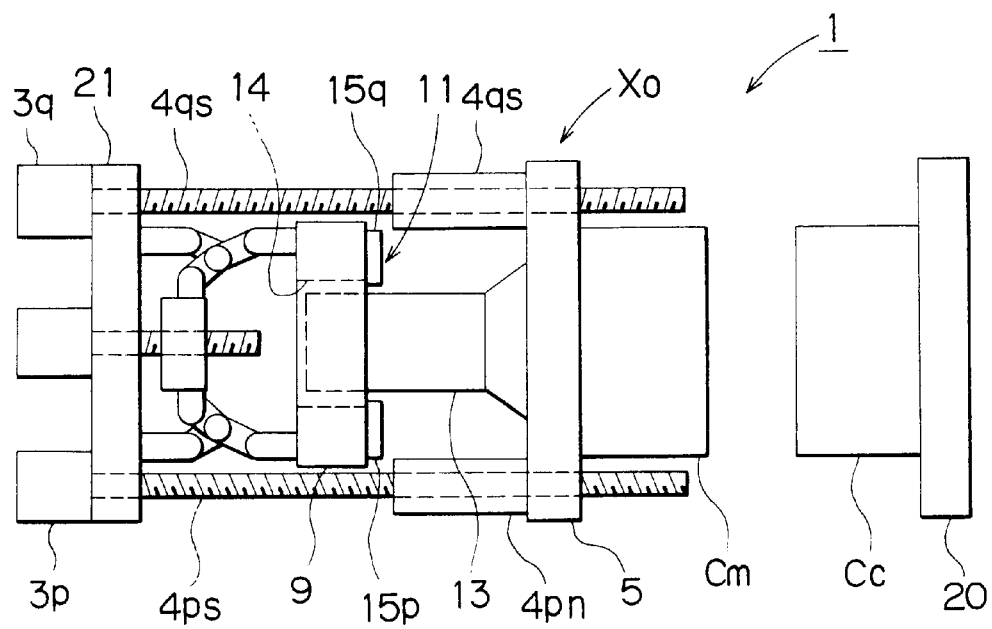
FIG. 5 is a schematic side view showing an operation state of the mold clamping apparatus in the mold clamping step.

Assume that the mold clamping apparatus 1 is now in a mold open position Xo shown in FIG. 5. In this case, the position of the drive platen 21 is set in advance by means of the drive-base-position setting mechanism 22, as will be described later. The movable platen 5 and the pressure platen 9 are situated at their farthest retreat positions. The clutch mechanism 11 is in a non-connection position at which the clutch plates 15p and 15q separate from each other, and the pressure receiving portion 13 is received in the through-hole 14 of the pressure platen 9.

Figure 6:
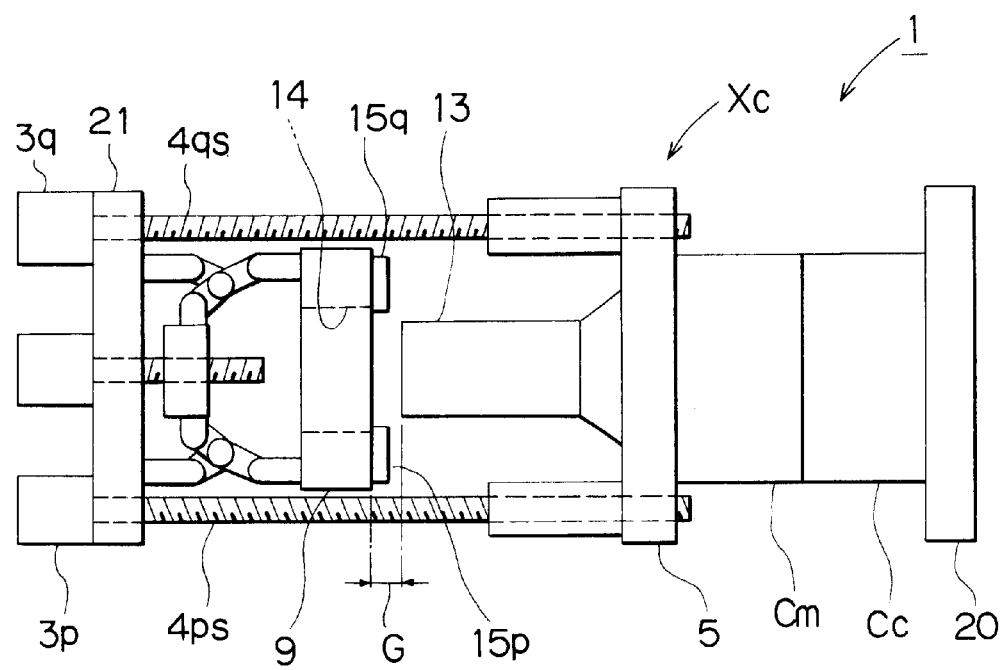
FIG. 6 is a schematic side view showing another operation state of the mold clamping apparatus in the mold clamping step.
Figure 7:
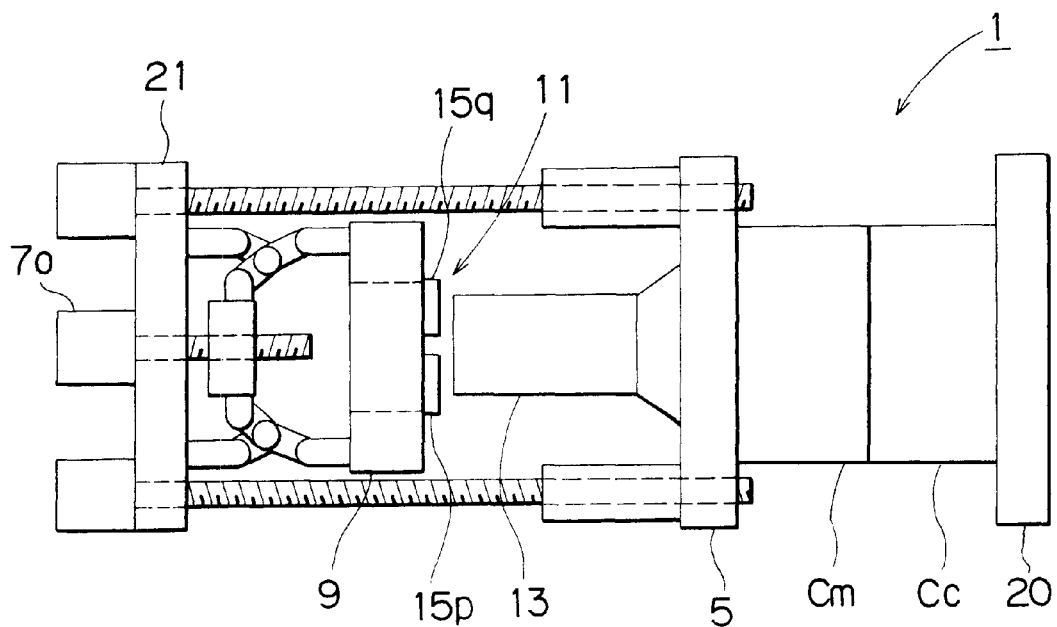
FIG. 7 is a schematic side view showing still another operation state of the mold clamping apparatus in the mold clamping step.
Figure 8:
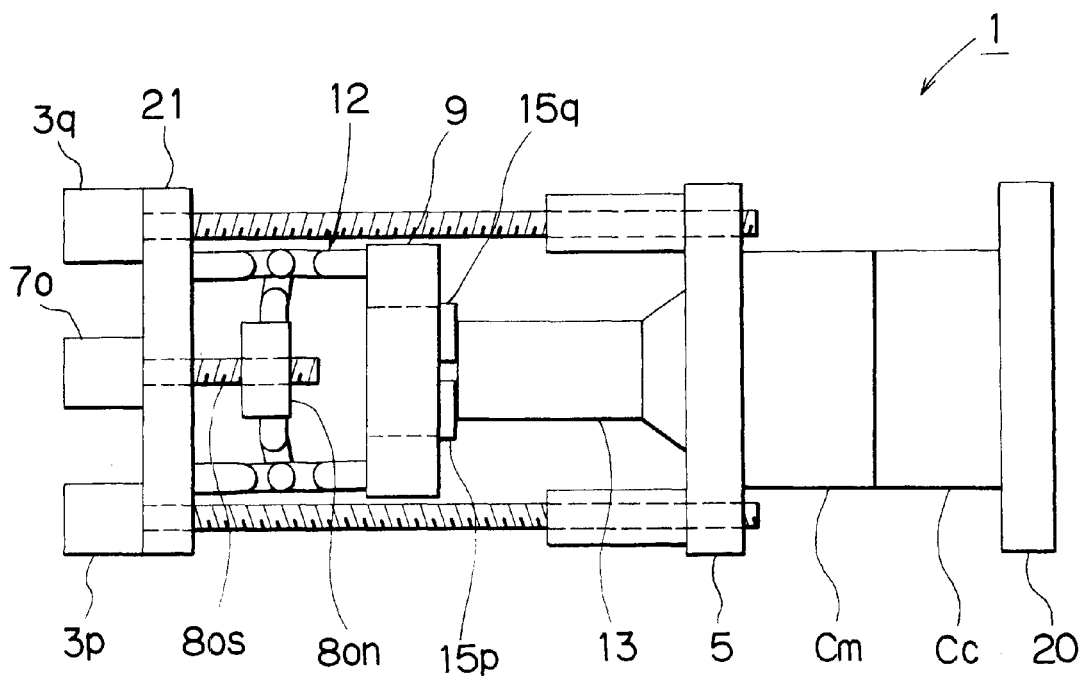
FIG. 8 is a schematic side view showing still another operation state of the mold clamping apparatus in the mold clamping step.

In a mold clamping step, first, the servomotors 3p and 3q (first drive motor portion 3) operate to thereby rotate the ball screws 4ps and 4qs of the ball-screw mechanisms 4p and 4q (step S1). As a result, the movable platen 5 advances at high speed from the mold open position Xo in the mold closing direction, thereby performing high-speed mold closing operation (step S2). When the movable platen 5 has reached a mold close position Xc, the servomotors 3p and 3q are stopped (steps S3 and S4). At the mold close position Xc, no clamping force is applied to the mold even though the mold is closed, and the movable mold Cm may or may not be in contact with the stationary mold Cc. Accordingly, the term "mold close position Xc" includes a position at which a slight clearance remains between the movable mold Cm and the stationary mold Cc and to which the movable mold Cm is moved before start of compressing operation in injection/compression molding. FIG. 6 shows a state in which the movable platen 5 has reached the mold close position Xc. In this state, the pressure receiving portion 13 is located outside the through-hole 14, and a gap G sufficient for receiving the clutch plates 15p and 15q is provided between the rear end of the pressure receiving portion 13 and the pressure platen 9. Accordingly, at this point, the drive motor 30 of the clutch mechanism 11 is operated in order to move the clutch plates 15p and 15q in their approaching directions, to thereby bring the clutch mechanism 11 into a connected state (step S5). FIG. 7 shows this state.

After the clutch mechanism 11 has been brought into the connected state, the servomotor 7o (second drive motor portion 7) is operated (step S6). As a result, the ball screw 8os of the ball-screw mechanism 8o is rotated, whereby the nut 8on advances, and thus the pressure platen 9 advances (step S7). The pressure platen 9 presses the pressure receiving portion 13 via the clutch plates 15p and 15q, whereby the movable platen 5 is pressed; i.e., a mold is clamped at high pressure (steps S8 and S9). In this case, the advancement stroke of the pressure platen 9 during the high pressure clamping operation is slight. Accordingly, in order to enable the high pressure clamping operation to be completed within such a slight advancement stroke, the servomotor 7o is operated, before initiation of the mold clamping step, in order to advance the pressure platen 9 to thereby position the pressure platen 9. Further, by means of the drive-base-position setting mechanism 22, the drive platen 21 is moved to a position at which the predetermined gap G is provided between the rear end of the pressure receiving portion 13 and the pressure platen 9 when the movable platen 5 has reached the mold close position Xc in the above-described state of the pressure platen 9 having been positioned.

As described above, in the mold clamping apparatus 1 according to the present embodiment, since the drive systems assume symmetry (or are balanced), smooth operation is enabled, and operation speed and pressure can be increased sufficiently. Also, the rationally designed configuration and layout imparts compactness to the mold clamping apparatus.

While the present invention has been described with reference to the preferred embodiment, the present invention is not limited thereto. Regarding structural details, shape, material, quantity, techniques, among others, modifications and any omission or addition may be possible as needed without departing from the scope of the invention. For example, the above embodiment is described while mentioning direct coupling between the ball-screw mechanism and the rotor shaft of each drive motor. However, the ball-screw mechanism and the rotor shaft may be connected, as needed, through a rotation transmission mechanism such as a planetary reduction gear mechanism. Further, although the embodiment shows the case in which the drive motors are attached to the pressure platen (or drive platen), the present invention can be practiced in a similar manner in a configuration in which the drive motors are attached to the stationary platen in order to pull the movable platen.

Notably, examples of the ball-screw mechanism include a so-called roller screw mechanism.

What is claimed is:

1. A mold clamping apparatus of an injection molding machine having a drive mechanism for opening, closing, and clamping a mold, wherein the drive mechanism comprises:
   a first drive mechanism portion including a first drive motor portion and a first ball-screw mechanism portion for advancing and retracting a movable platen in order to effect a high-speed mold opening/closing operation;
   a second drive mechanism portion including a second drive motor portion and a second ball-screw mechanism portion for pressing a pressure platen in order to effect the high-pressure mold clamping operation; and
   a clutch mechanism disposed on the pressure platen and having a pair of symmetrically disposed clutch plates for applying pressure to the movable platen when the movable platen is located at a mold close position.

2. A mold clamping apparatus of an injection molding machine according to claim 1, wherein the second drive mechanism portion comprises:
   a single drive motor serving as the second drive motor portion and a ball-screw mechanism serving as the second ball-screw mechanism portion, the drive motor and the ball-screw mechanism being disposed at the center of the movable platen; and
   a toggle link mechanism driven by the ball-screw mechanism.

3. A mold clamping apparatus of an injection molding machine according to claim 2, wherein the first drive mechanism portion is disposed on either lateral side of the second drive mechanism portion and comprises a drive motor serving as the first drive motor portion and a ball-screw mechanism serving as the first ball-screw mechanism portion.

4. A mold clamping apparatus of an injection molding machine according to claim 1, wherein the movable platen has a pressure receiving portion projecting rearward from the movable platen, and the pressure platen has a through-hole which the pressure receiving portion penetrates.

5. A mold clamping apparatus of an injection molding machine according to claim 4, wherein the clutch plates are inserted into and removed from a gap between the pressure receiving portion and the pressure platen.

* * * * *